United States Patent
Gu et al.

(10) Patent No.: US 10,304,212 B2
(45) Date of Patent: May 28, 2019

(54) GRAPHIC DATA COMPRESSION DEVICE AND GRAPHIC DATA COMPRESSION METHOD

(71) Applicant: VIA Alliance Semiconductor Co., Ltd., Shanghai (CN)

(72) Inventors: Deming Gu, Shanghai (CN); Zhou Hong, Cupertino, CA (US)

(73) Assignee: VIA Alliance Semiconductor Co., Ltd., Shanghai (CN)

( * ) Notice: Subject to any disclaimer, the term of this patent is extended or adjusted under 35 U.S.C. 154(b) by 153 days.

(21) Appl. No.: 15/299,481

(22) Filed: Oct. 21, 2016

(65) Prior Publication Data

US 2017/0124729 A1   May 4, 2017

(30) Foreign Application Priority Data

Nov. 4, 2015   (CN) .......................... 2015 1 0737520

(51) Int. Cl.
  *G06T 1/20*   (2006.01)
  *G06T 1/60*   (2006.01)
  *G06T 9/00*   (2006.01)
(52) U.S. Cl.
  CPC .................. *G06T 9/00* (2013.01); *G06T 1/20* (2013.01); *G06T 1/60* (2013.01)
(58) Field of Classification Search
  None
  See application file for complete search history.

(56) References Cited

U.S. PATENT DOCUMENTS

| 8,933,825 | B2* | 1/2015 | Fallon ...................... G06T 9/00 341/107 |
| 2003/0179938 | A1* | 9/2003 | Van der Vleuten .... H03M 7/30 382/232 |
| 2012/0250758 | A1 | 10/2012 | Jou et al. |
| 2014/0219558 | A1* | 8/2014 | Teng ........................ G06T 9/00 382/166 |
| 2015/0120683 | A1* | 4/2015 | Okuyama ......... G06F 17/30153 707/693 |

FOREIGN PATENT DOCUMENTS

| TW | I249290 | 2/2006 |
| TW | 201240471 | 10/2012 |

* cited by examiner

*Primary Examiner* — YuJang Tswei
(74) *Attorney, Agent, or Firm* — Chieh-Mei Wang (57) ABSTRACT

A graphic data compression device includes a processing unit for processing graphic data and a mixed-type compression unit for compressing the data processed by the processing unit. The mixed-type compression unit includes a lossless compression module and a nearly-lossless compression module. The lossless compression module performs a compression on processed data by a lossless compression algorithm. The nearly-lossless compression module includes an adjustment module and a compression module. The adjustment module performs an adjustment on the processed data to reduce a size of the processed data. The compression module performs, by the lossless compression algorithm, a compression on the data adjusted by the adjustment module. A graphic data compression method of the graphic data compression device is also provided. The graphic data compression device and method of the present invention reduce bandwidth load and memory occupancy, thereby effectively improving the usage of memory capacity.

13 Claims, 4 Drawing Sheets

GRAPHIC DATA COMPRESSION DEVICE AND GRAPHIC DATA COMPRESSION METHOD

FIELD OF THE INVENTION

The present invention relates to the image processing technology field, and more particularly to a graphic data compression device and a graphic data compression method.

BACKGROUND OF THE INVENTION

With the continuous improvement of graphics processor performance, the demand for bandwidth and memory capacity also increases. Currently, the use of bandwidth can be reduced through: First, using offline tools to perform lossy compression on texture data, that is, using compression format such as DXT, ETC, ASTC, PVRTC to compress texture data; Second, after the data is processed, performing lossless compression on data such as depth, template or shading target.

Figure 1:
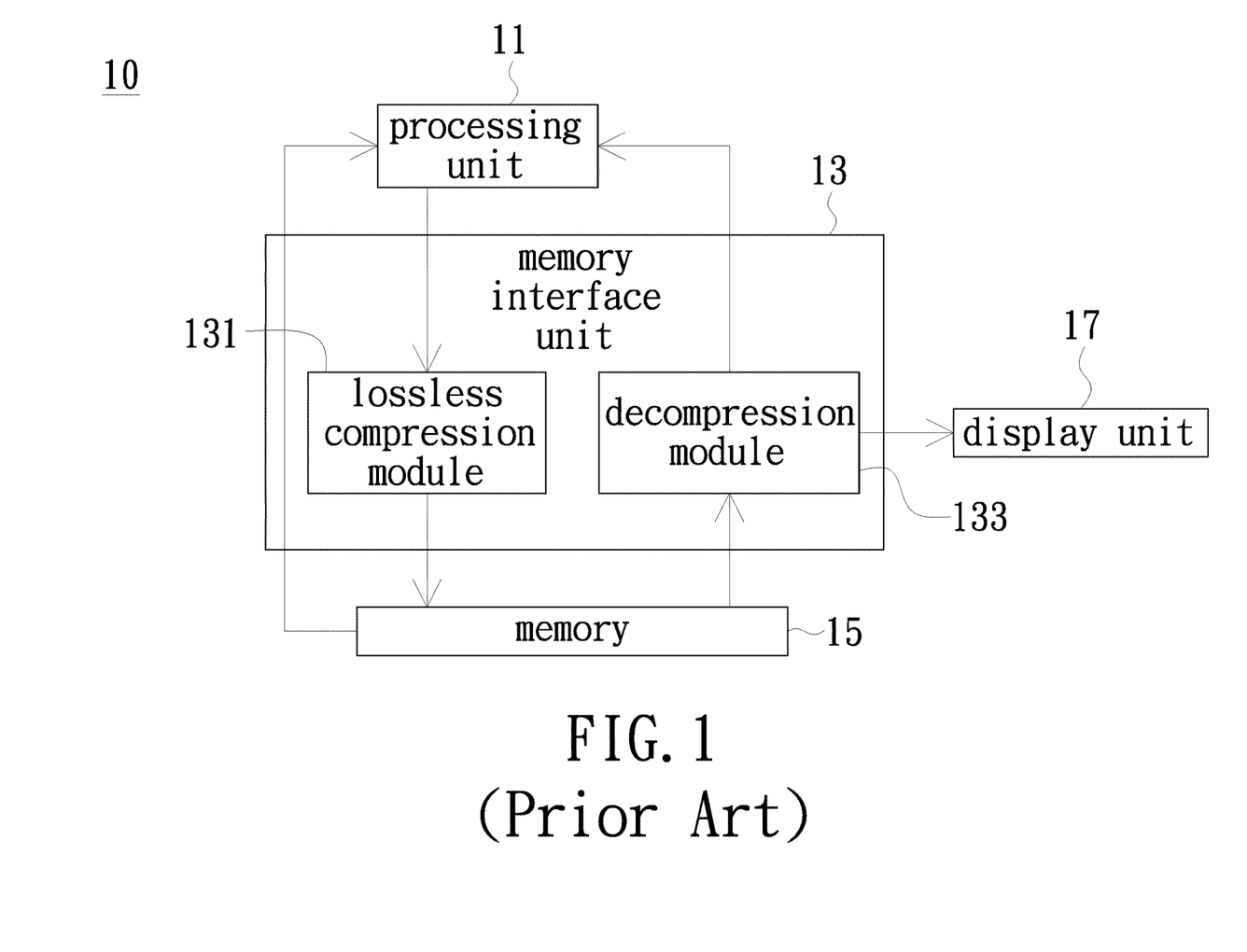
FIG. 1 is a block view of a graphic data compression device in the prior art.

Please refer to FIG. 1, which is a block view of a graphic data compression device in prior art. As shown in FIG. 1, the graphic data compression device 10 in prior art includes a processing unit 11, a memory interface unit 13, a memory 15 and a display unit 17. The memory interface unit 13 includes a lossless compression module 131 and a decompression module 133. During the graphic data processing, the processing unit 11 first reads, through the memory interface unit 13, the resource data needed for shading, such as texture data, vertex data, index data, etc. After the processing is completed, the lossless compression module 131 perform a lossless compression on the shading target data in the processed data and then the memory interface unit 13 writes the processed and compressed data into the memory 15. Then, if the compressed data needs a further processing, such as the post-processing of depth of field (DOF), high dynamic range (HDR) or deferred shading, the decompression module 133 reads the data in need of post-processing from the memory 15 and decompresses the data. Then, the decompressed data is provided to the processing unit 11 for post-processing. Similarly, the lossless compression module 131 perform a lossless compression on the data having a post-processing by the processing unit 11 and then the memory interface unit 13 writes the compressed data into the memory 15. Then, the decompression module 133 or a decompression module (not shown) of the display unit 17 reads the finally-processed data from the memory 15 for data decompression and then provides the decompressed data to the display unit 17 for graphic displaying on a screen.

By performing the above-described compression, the demand for bandwidth for data processing is effectively reduced. However, in order to avoid compression failure, the memory 15 needs to allocate a fixed area to store the compressed data; wherein the storage space of the fixed area is usually not smaller than the size of the data before compression. That is, even the processed data is compressed, the storage space in the memory 15 for the compressed data is still not smaller than the size of the data before compression. Therefore, the above-described compression can reduce bandwidth load only, but is unable to reduce the usage of storage space in the memory 15. Further, for high-resolution screen such as the popular 4K screen, the required capacity of the memory cannot be reduced, thus hindering the reduction in cost of the memory.

BRIEF SUMMARY OF THE INVENTION

Therefore, one object of the present invention is to provide a graphic data compression device capable of reducing bandwidth and memory occupancy, thereby effectively improving the usage of memory capacity.

The present invention provides a graphic data compression device, which includes a processing unit and a mixed-type compression unit. The processing unit is configured to process graphic data. The mixed-type compression unit is configured to perform a compression on the data processed by the processing unit. The mixed-type compression unit includes a lossless compression module and a nearly-lossless compression module. The lossless compression module is configured to perform the compression on the processed data by a lossless compression algorithm. The nearly-lossless compression module includes an adjustment module and a compression module. The adjustment module is configured to perform an adjustment on the processed data to reduce a size of the processed data. The compression module is configured to perform, by the lossless compression algorithm, a compression on the data adjusted by the adjustment module. The mixed-type compression unit is further configured to determine whether the compression performed by the lossless compression module is successful, and to output the data compressed by the lossless compression module when the compression performed by the lossless compression module is determined to be successful. The mixed-type compression unit is further configured to further determine whether the compression performed by the nearly-lossless compression module is successful when the compression performed by the lossless compression module fails, and to output the data compressed by the nearly-lossless compression module when the compression performed by the nearly-lossless compression module is determined to be successful or to directly output uncompressed data processed by the processing unit.

The present invention further provides a graphic data compression method, which includes steps of: configuring the processing unit to provide the processed data to the mixed-type compression unit; configuring the mixed-type compression unit to perform a compression on the processed data; configuring the mixed-type compression unit to determine whether the compression performed by the lossless compression module is successful; if the compression performed by the lossless compression module is successful, configuring the mixed-type compression unit to output the data compressed by the lossless compression module; if the compression performed by the lossless compression module fails, configuring the mixed-type compression unit to determine whether the compression performed by the nearly-lossless compression module is successful; if the compression performed by the nearly-lossless compression module is successful, configuring the mixed-type compression unit to output the data compressed by the nearly-lossless compression module; and if the compression performed by the nearly-lossless compression module fails, configuring the mixed-type compression unit to directly output uncompressed data processed by the processing unit.

In summary, the graphic data compression method not only employs lossless compression to compress data but also nearly-lossless compression to compress data if the lossless compression fails. Because the nearly-lossless compression module first performs an adjustment on the data to-be-compressed to reduce the data size and then performs a lossless compression on the data with reduced size, the success rate of data compression increases. In addition, because the memory only needs to allocate a relatively small fixed area for storing the compressed data, the storage space for the compressed data in the memory is reduced. As a result, the graphic data compression method of the present embodiment not only reduces bandwidth load but also memory occupancy, thereby effectively improving the usage of memory capacity.

BRIEF DESCRIPTION OF THE DRAWINGS

The present disclosure will become more readily apparent to those ordinarily skilled in the art after reviewing the following detailed description and accompanying drawings, in which.

DETAILED DESCRIPTION OF PREFERRED EMBODIMENTS

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 2:
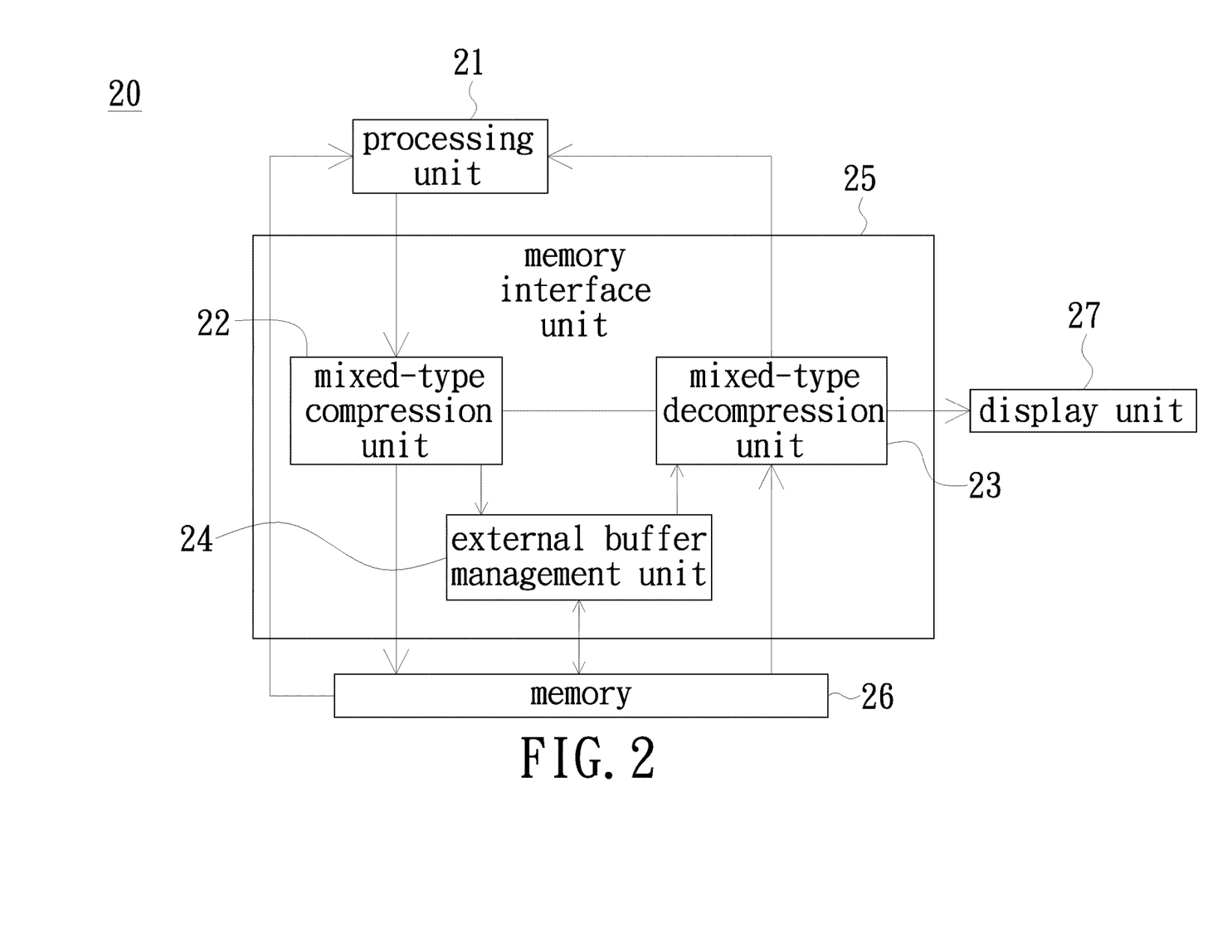
FIG. 2 is a block view of a graphic data compression device in accordance with an embodiment of the present invention.

Please refer to FIG. 2, which is a block view of a graphic data compression device in accordance with an embodiment of the present invention. As shown in FIG. 2, the graphic data compression device 20 of the present embodiment includes a processing unit 21, a mixed-type compression unit 22, a mixed-type decompression unit 23, an external buffer management unit 24, a memory interface unit 25, a memory 26 and a display unit 27. In the present embodiment, all of the mixed-type compression unit 22, the mixed-type decompression unit 23 and the external buffer management unit 24 are disposed in the memory interface unit 25. In another embodiment, some or all of the mixed-type compression unit 22, the mixed-type decompression unit 23 and the external buffer management unit 24 may be disposed outside the memory interface unit 25.

In the present embodiment, the processing unit 21 may be an independent graphics processor, or, the processing unit 21 may be integrated in a central processor (not shown). The processing unit 21 includes a shading pipeline, which is mainly configured for graphics data processing, such as modeling and shading. The graphic data may be texture data, which is read by the processing unit 21 from the memory 26 through the memory interface unit 25. The data processed by the processing unit 21 may include the data such as shading target, depth, templates, etc. If the data processed by the processing unit 21 needs the processing unit 21 to perform the post-processing related to depth of field (DOF), high dynamic range (HDR) and deferred shading, the data processed by the processing unit 21 can be used as new texture data and provided to the processing unit 21 for further processing.

The mixed-type compression unit 22 is configured to perform a compression on the data processed by the processing unit 21. The compressed data satisfies a predetermined compression ratio; specifically, the ratio of the data size after compression to the data size before compression is not greater than the compression ratio.

The mixed-type decompression unit 23 is configured to perform a decompression on the data compressed by the mixed-type compression unit 22.

The memory interface unit 25 is configured to perform read or write on the data stored in the memory 26.

In the present embodiment, the memory 26 may be a synchronous dynamic random access memory (SDRAM), a double data rate SDRAM (DDR SDRAM), a synchronous graphics random-access memory (SGRAM) or a double data rate SGRAM (DDR SGRAM), etc.

The memory 26 is configured to store the graphics data to be processed or after being processed by the processing unit 21. The memory 26 includes fixed area and dynamic buffer area, which are preallocated according to the size of the original data and the compression ratio; wherein the original data is referred to the data before compression by the mixed-type compression unit 22. Specifically, the fixed area is used to store the data compressed by the mixed-type compression unit 22; and the dynamic buffer area is used to store the data resulted from failed compression. For example, if the size of the original data is 4K bits and the compression ratio is 50%, the fixed area may need a space at least 2K bits and the dynamic buffer area may need a space at least 4K bits.

The external buffer management unit 24 is configured to perform a management on the storage space of the memory 26 when the mixed-type compression unit 22 fails to compress data. Specifically, when the mixed-type compression unit 22 fails to compress data, the external buffer management unit 24 uses the spare space in the memory 26 to form the dynamic buffer area for storing the data that have been processed by the processing unit 21 but have not been compressed. It is to be noted that because the compression failure, there is no compressed data to be stored in the fixed area in the memory 26; therefore, the fixed area is converted into the spare space and consequently the dynamic buffer area formed by the external buffer management unit 24 may include the fixed area.

The display unit 27 is configured to provide the data to-be-displayed, which is stored in the memory 26 and processed by the processing unit 21, to a screen (not shown) for displaying the graphic. Specifically, the to-be-displayed data is first read through the memory interface unit 25, decompressed by the mixed-type decompression unit 23, and then provided to the display unit 27. In another embodiment, the display unit 27 is provided with the memory interface unit and the mixed-type decompression unit; therefore, the memory interface unit can directly read the to-be-displayed data in the memory 26 and then the mixed-type decompression unit decompress the to-be-displayed data and provide the decompressed to-be-displayed data to the screen for displaying the graphic.

Figure 3:
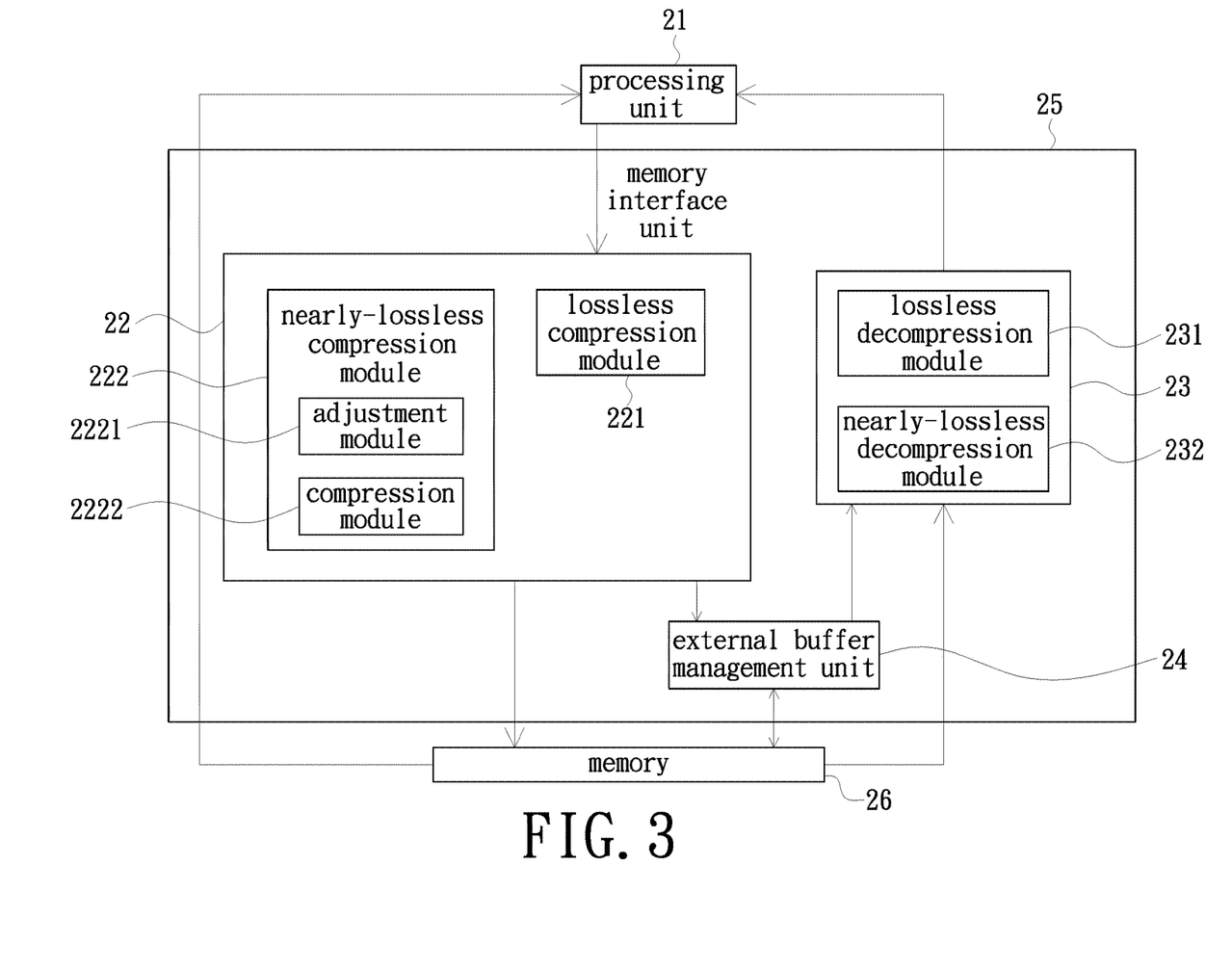
FIG. 3 is a detailed block view of part of the graphic data compression device of FIG. 2 in accordance with an embodiment of the present invention.

Please refer to FIG. 3, which is a detailed block view of part of the graphic data compression device of FIG. 2 in accordance with an embodiment of the present invention. As shown in FIG. 3, the mixed-type compression unit 22 includes a lossless compression module 221 and a nearly-lossless compression module 222. The mixed-type decompression unit 23 includes a lossless decompression module 231 and a nearly-lossless decompression module 232.

The lossless compression module 221 is configured to perform a compression on the data processed by the processing unit 21 by a lossless compression algorithm;

wherein the lossless compression algorithm may be the Huffman algorithm or the Lenpel-Ziv & Welch algorithm, etc.

The nearly-lossless compression module 222 includes an adjustment module 2221 and a compression module 2222. The adjustment module 2221 is configured to perform an analysis on the data processed by the processing unit 21 to obtain an attribute of the data and perform a corresponding adjustment on the data according to the attribute of the data to reduce the size of the data. The attribute of the data is the category of information, such as color, brightness, template and depth texture, of the graphics represented by the data. By using the human eye having different sensitivity for each attribute of the graphics, the adjustment module 2221 can perform a specific adjustment on the data according to the respective attributes. For example, it is understood that human eye is more sensitive to light but is less sensitive to color of the scene; therefore, even when there is a deviation in the color of the graphic, human eye may not be able to sense the deviation. And relatively, if there is a deviation in brightness of the graphic, human eye may easily sense the deviation. Namely, graphic has a higher deviation tolerance to color, relative to brightness. In addition, the depth texture generally represents the important details in graphic; therefore, the displayed graphic may show obvious deficiency if there is a deviation in the depth texture of the graphic. Namely, graphic has a zero deviation tolerance to depth texture as no deviation is allowed in the depth texture of the graphic. In summary, by performing experiments on each attribute of data based on the experience values, the maximum allowable deviation of each attribute of the graphic is obtained. Then, performing an adjustment on the original data according to the maximum allowable deviation, the finally-displayed graphic can satisfy certain requirements, that is, the deficiency may not be sensed by human eyes even when the data has the maximum allowable deviation in the respective attribute. In the present embodiment, the adjustment module 2221 is preset with the maximum allowable deviation of each attribute. Therefore, when the nearly-lossless compression module 222 performs a compression on the data processed by the processing unit 21, the adjustment module 2221 first performs an analysis on the data to obtain the attribute of the data and then performs a corresponding adjustment on the data according to the maximum allowable deviation of the attribute to reduce the size of the data. For example, if the maximum allowable deviation of color is in a grayscale range of +2 to −2, the adjustment module 2221 may perform a subtle adjustment on the data with color attribute, thereby properly reducing the size of the data with color attribute.

The compression module 2222 is configured to perform, by the lossless compression algorithm, a compression on the data adjusted by the adjustment module 2221. In one embodiment, the lossless compression algorithm may be the Huffman algorithm or the Lenpel-Ziv & Welch algorithm, etc.

The lossless decompression module 231 is configured to perform a decompression on the data compressed by the lossless compression module 221. The nearly-lossless decompression module 232 is configured to perform a decompression on the data compressed by the nearly-lossless compression module 222.

In the present embodiment, after the data is processed by the processing unit 21, the lossless compression module 221 and the nearly-lossless compression module 222 of the mixed-type compression unit 22 perform compressions on the processed data at the same time. When the compression is complete, the mixed-type compression unit 22 first determines whether the compression performed by the lossless compression module 221 is successful, namely determines whether the compressed data satisfies a predetermined compression ratio. If the ratio of the data size after compression to the data size before compression is not greater than the compression ratio, it is determined that the compression is successful. On the contrary, it is determined that the compression fails if the ratio of the data size after compression to the data size before compression is greater than the compression ratio.

If the compression performed by the lossless compression module 221 is successful, the mixed-type compression unit 22 outputs the data compressed by the lossless compression algorithm and the burst length (BL). Then, the memory interface unit 25 writes the data compressed by the lossless compression algorithm into the fixed area in the memory 26 for storing the compressed data and writes the burst length into a corresponding location in the memory 26. In the present embodiment, the burst length refers to the number of address of one burst read-and-write. Specifically, the burst length is used to represent the size of the compressed data and the mean for the compression and is also used to control the read of the memory data and the decoding.

If the compression performed by the lossless compression module 221 fails, the mixed-type compression unit 22 then determines that whether the compression performed by the nearly-lossless compression module 222 is successful. If the compression performed by the nearly-lossless compression module 222 is successful, the mixed-type compression unit 22 outputs the data compressed by a nearly-lossless compression algorithm and the burst length. Then, the memory interface unit 25 writes the data compressed by the nearly-lossless compression algorithm into the fixed area of the memory 26 for storing the compressed data and writes the burst length into the memory 26.

In addition, when the data compression is successful, the memory interface unit 25 notifies the address to the external buffer management unit 24 and accordingly the external buffer management unit 24 releases the repeated stored data. In the present embodiment, the repeated stored data may include the data resulted from previously failed compression.

In an extremely small probability if the compression performed by the nearly-lossless compression module 222 also fails, the mixed-type compression unit 22 directly outputs the data, which is processed by the processing unit 21 but is uncompressed, to the external buffer management unit 24. Then, the external buffer management unit 24 forms the dynamic buffer area in the memory 26, writes the uncompressed data processed by the processing unit 21 into the dynamic buffer area, and writes the burst length into the memory 26, thereby facilitating the storage of the uncompressed data processed by the processing unit 21 in the dynamic buffer area. In the present embodiment, the burst length may be identified as special identification data to represent that the written data is non-compressed data.

In another embodiment, the mixed-type compression unit 22 may use the lossless compression module 221 to compress the data processed by the processing unit 21 first, and if the compression performed by the lossless compression module 221 fails, then further use the nearly-lossless compression module 222 to compress the processed data, rather than performing the two compressions at the same time. Therefore, the mixed-type compression unit 22 has lesser burdens to process data.

When processing unit 21 needs to read data in the memory 26, first, the memory interface unit 25 reads the burst length and determines the compression state of the data according to the burst length. If it is determined that the data is in a compressed state, the memory interface unit 25 provides the burst length and the data to the mixed-type decompression unit 23. Then, the mixed-type decompression unit 23 determines that the data is in lossless compressed state or nearly-lossless compressed state according to the burst length and the information of the data head. If it is determined that the data is in the lossless compressed state, the lossless decompression module 231 is employed to perform a decompression on the data. On the contrary, if it is determined that the data is in the nearly-lossless compressed state, the nearly-lossless decompression module 232 is employed to perform a decompression on the data. Then, the decompressed data is provided to the processing unit 21.

If it is determined that the data is in a uncompressed state according to the burst length, the mixed-type decompression unit 23 provides the storage address of the data in the dynamic buffer area to the external buffer management unit 24. Then, the external buffer management unit 24 provides the data to the mixed-type decompression unit 23. Then, the mixed-type decompression unit 23 directly provides the data to the processing unit 21.

In addition, if the display unit 27 needs to read the data in the memory 26, the data read process is similar to that of the processing unit 21 as described above, and no redundant detail is to be given herein.

In summary, the graphic data compression device 20 of the present embodiment employs the mixed-type compression unit 22 including the lossless compression module 221 and the nearly-lossless compression module 222. Because the data can be compressed by the nearly-lossless compression module 222 when the compression performed by the lossless compression module 221 fails, the success rate of data compression increases due to that the nearly-lossless compression module 222 first performs an adjustment on the to-be-compressed data to reduce the data size and then performs a compression on the to-be-compressed data with reduced size. In addition, because of the memory 26 only needs to allocate a relatively small fixed area for storing the compressed data, the storage space for the compressed data in the memory 26 is reduced. Further, to avoid rare incidence of data compression failure, the graphic data compression device 20 of the present embodiment is further provided with the external buffer management unit 24, which is used to manage the storage space in the memory 26 when data compression failure occurs. Specifically, the spare storage space in the memory 26 is used to form the dynamic buffer area for storing the data that have been processed by the processing unit 21 but have not been compressed. Therefore, the usage of the storage space in the memory 26 increases. As a result, the graphic data compression device 20 of the present embodiment not only reduces the bandwidth load but also reduces the occupancy of the memory 26, thereby effectively improving the capacity requirement of the memory 26.

Figure 4:
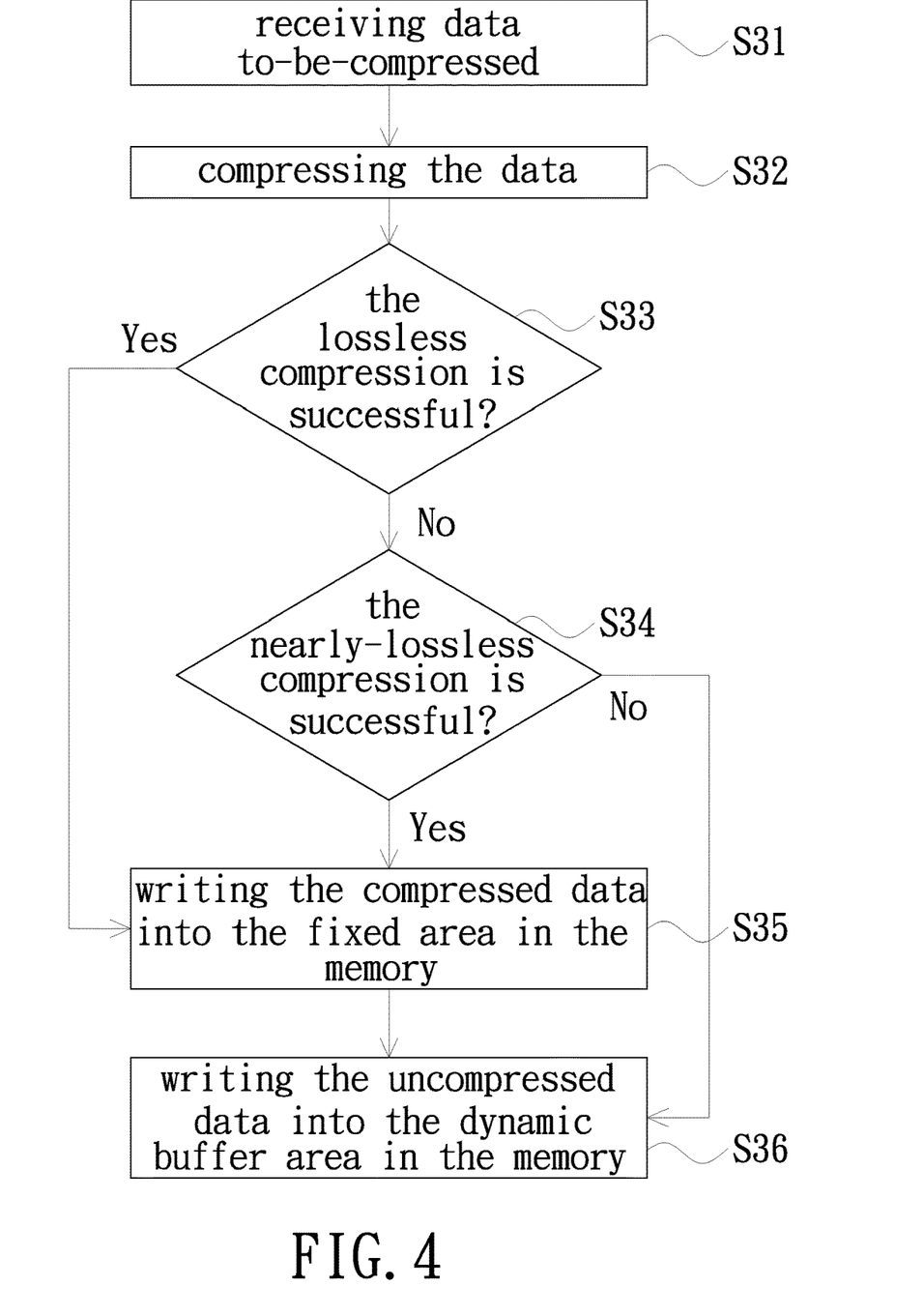
FIG. 4 is a flowchart illustrating a graphic data compression method in accordance with an embodiment of the present invention.

Please refer to FIG. 4, which is a flowchart illustrating a graphic data compression method in accordance with an embodiment of the present invention, wherein the graphic data compression method can be used with the aforementioned graphic data compression device 20 of FIG. 2. As show in FIG. 4, the graphic data compression method of the present embodiment includes steps as follow.

Step S31: receiving data to-be-compressed.

Please refer to FIGS. 3 and 4. In this step, the processing unit 21 provides the processed data to the mixed-type compression unit 22 for data compression, wherein the processed data is referred to as the data to-be-compressed.

Step S32: compressing the data.

In the present embodiment, the lossless compression module 221 and the nearly-lossless compression module 222 of the mixed-type compression unit 22 perform compressions on the processed data at the same time. Specifically, the lossless compression module 221 performs a compression on the processed data by the lossless compression algorithm. The adjustment module 2221 of the nearly-lossless compression module 222 performs an analysis on the processed data to obtain an attribute of the data and performs a corresponding adjustment on the data according to the maximum allowable deviation of the attribute to reduce the size of the data; then the compression module 2222 of the nearly-lossless compression module 222 performs a compression on the processed data by the lossless compression algorithm.

In another embodiment, the mixed-type compression unit 22 may use the lossless compression module 221 to perform a compression on the processed data first and if the compression performed by the lossless compression module 221 fails, then further use the nearly-lossless compression module 222 to perform a compression on the processed data.

Step S33: determining whether the lossless compression is successful.

In this step, when the compression is completed, the mixed-type compression unit 22 first determines whether the compression performed by the lossless compression module 221 is successful, namely determines whether the compressed data satisfies a predetermined compression ratio. If the ratio of the data size after compression to the data size before compression is not greater than the compression ratio, it is determined that the compression is successful. On the contrary, it is determined that the compression fails if the ratio of the data size after compression to the data size before compression is greater than the compression ratio. The graphic data compression method of the preset embodiment performs step S35 if the lossless compression is successful; alternatively, the graphic data compression method of the preset embodiment performs step S34 if the lossless compression fails.

Step S34: determining whether the nearly-lossless compression is successful.

In this step, the mixed-type compression unit 22 further determines whether the compression performed by the nearly-lossless compression module 222 is successful if the lossless compression fails. The graphic data compression method of the preset embodiment performs step S35 if the nearly-lossless compression is successful; alternatively, the graphic data compression method of the preset embodiment performs step S36 if the nearly-lossless compression fails.

Step S35: writing the compressed data into the fixed area of the memory 26.

In this step, the mixed-type compression unit 22 outputs the compressed data, and the memory interface unit 25 writes the compressed data into the fixed area of the memory 26 for storing the compressed data. Specifically, if the data is compressed by the lossless compression algorithm, the mixed-type compression unit 22 outputs the data compressed by the lossless compression algorithm and the burst length, and then the memory interface unit 25 writes the data compressed by the lossless compression algorithm into the fixed area in the memory 26 for storing the compressed data and writes the burst length into a corresponding location in the memory 26. If the data is compressed by the nearly-lossless compression algorithm, the mixed-type compression unit 22 outputs the data compressed by the nearly-lossless compression algorithm and the burst length, and then the memory interface unit 25 writes the data compressed by the nearly-lossless compression algorithm into the fixed area of the memory 26 for storing the compressed data and writes the burst length into a corresponding location in the memory 26. In the present embodiment, the burst length refers to the number of address of one burst read-and-write. Specifically, the burst length is used to represent the size of the compressed data and the mean for the compression and is also used to control the read of the memory data and the decoding.

Step S36: writing the uncompressed data into the dynamic buffer area in the memory 26.

In this step, if the compression performed by the nearly-lossless compression module 222 also fails, the mixed-type compression unit 22 directly outputs the data, which is processed by the processing unit 21 but is uncompressed, to the external buffer management unit 24. Then, the external buffer management unit 24 forms the dynamic buffer area in the memory 26, writes the uncompressed data processed by the processing unit 21 into the dynamic buffer area, and writes the burst length into the memory 26, thereby facilitating the storing of the uncompressed data processed by the processing unit 21 in the dynamic buffer area. In the present embodiment, the burst length may be identified as special identification data to represent that the written data is non-compressed data.

In summary, the graphic data compression method not only employs lossless compression to compress data but also nearly-lossless compression to compress data if the lossless compression fails. Because the nearly-lossless compression module first performs an adjustment on the data to-be-compressed to reduce the data size and then performs a lossless compression on the data with reduced size, the success rate of data compression increases. In addition, because the memory only needs to allocate a relatively small fixed area for storing the compressed data, the storage space for the compressed data in the memory is reduced. As a result, the graphic data compression method of the present embodiment not only reduces bandwidth load but also memory occupancy, thereby effectively improving the usage of memory capacity.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A graphic data compression device, comprising:
a processing unit, configured to process graphic data into processed data; and
a mixed-type compression unit, configured to perform a lossless compression and a nearly-lossless compression on the processed data, the mixed-type compression unit comprising:
a lossless compression module, configured to perform the compression on the processed data by a lossless compression algorithm; and
a nearly-lossless compression module, comprising:
an adjustment module, configured to perform an adjustment on the processed data to reduce a size of the processed data; and
a compression module, configured to perform, by the lossless compression algorithm, a compression on the processed data adjusted by the adjustment module,
wherein the mixed-type compression unit is further configured to determine whether the compression performed by the lossless compression module is successful, and to output the data compressed by the lossless compression module when the compression performed by the lossless compression module is determined to be successful,
wherein the mixed-type compression unit is further configured to further determine whether the compression performed by the nearly-lossless compression module is successful when the compression performed by the lossless compression module is determined to be unsuccessful, and to output the data compressed by the nearly-lossless compression module when the compression performed by the nearly-lossless compression module is determined to be successful or to directly output uncompressed processed data,
wherein the adjustment module is preset with maximum allowable deviations of different attributes, wherein when the nearly-lossless compression module performs the compression on the processed data, the adjustment module performs an analysis on the processed data to obtain the attributes of the processed data and perform the adjustment on the processed data according to the maximum allowable deviations of the attributes to reduce the size of the processed data, wherein the attributes comprise color, brightness, template and depth texture of the graphic data.

2. The graphic data compression device according to claim 1, further comprising a memory, wherein the memory comprises a fixed area and a dynamic buffer area preallocated according to the size of original data and a predetermined compression ratio, the original data is the data before compression by the mixed-type compression unit, the fixed area is used to store the data compressed by the mixed-type compression unit, and the dynamic buffer area is used to store the uncompressed data processed by the processing unit.

3. The graphic data compression device according to claim 2, further comprising an external buffer management unit, wherein the external buffer management unit is configured to use a spare space in the memory to form the dynamic buffer area when the compression performed by the mixed-type compression unit fails.

4. The graphic data compression device according to claim 3, wherein the dynamic buffer area comprises the fixed area.

5. The graphic data compression device according to claim 2, wherein if a ratio of the size of the data after compression by the mixed-type compression unit to the size of data before compression is not greater than the predetermined compression ratio, the compression is determined to be successful, and if the ratio of the size of the data after compression to the size of the data before compression is greater than the predetermined compression ratio, the compression is determined to be unsuccessful.

6. The graphic data compression device according to claim 1, wherein the lossless compression module and the nearly-lossless compression module of the mixed-type compression unit perform compressions on the processed data simultaneously.

7. The graphic data compression device according to claim 1, wherein the mixed-type compression unit uses the lossless compression module to compress the processed data and, if the compression performed by the lossless compression module fails, further uses the nearly-lossless compression module to compress the processed data.

8. The graphic data compression device according to claim 1, further comprising a mixed-type decompression unit, wherein the mixed-type decompression unit comprises:
   a lossless decompression module, configured to perform a decompression on the data compressed by the lossless compression module; and
   a nearly-lossless decompression module, configured to perform a decompression on the data compressed by the nearly-lossless compression module.

9. A graphic data compression method of a graphic data compression device, the graphic data compression device comprising a processing unit and a mixed-type compression unit, the mixed-type compression unit comprising a lossless compression module and a nearly-lossless compression module, the lossless compression module being configured to perform a compression on processed data by a lossless compression algorithm, the nearly-lossless compression module comprising an adjustment module and a compression module, the adjustment module being configured to perform an adjustment on the processed data to reduce a size of the processed data, the compression module being configured to perform, by the lossless compression algorithm, a compression on the processed data adjusted by the adjustment module, the graphic data compression method comprising steps of:
   configuring the processing unit to provide the processed data to the mixed-type compression unit;
   configuring the mixed-type compression unit to perform a lossless compression and a nearly-lossless compression on the processed data;
   configuring the mixed-type compression unit to determine whether the compression performed by the lossless compression module is successful;
   if the compression performed by the lossless compression module is successful, configuring the mixed-type compression unit to output the data compressed by the lossless compression module;
   if the compression performed by the lossless compression module fails, configuring the mixed-type compression unit to determine whether the compression performed by the nearly-lossless compression module is successful;
   if the compression performed by the nearly-lossless compression module is successful, configuring the mixed-type compression unit to output the data compressed by the nearly-lossless compression module; and
   if the compression performed by the nearly-lossless compression module fails, configuring the mixed-type compression unit to directly output uncompressed processed data,
   wherein the adjustment module is preset with maximum allowable deviations of different attributes, wherein when the nearly-lossless compression module performs a compression on the processed data, the adjustment module performs an analysis on the processed data to obtain the attributes of the processed data and performs the adjustment on the processed data according to the maximum allowable deviations of the attributes to reduce the size of the processed data, wherein the attributes comprise color, brightness, template and depth texture of the graphic data.

10. The graphic data compression method according to claim 9, further comprising a step of:
   after the compression performed by the mixed-type compression unit is determined to be successful, writing the compressed data into a fixed area in a memory of the graphic data compression device, wherein the fixed area is preallocated according to the size of original data and a predetermined compression ratio, the original data is the data before compressed by the mixed-type compression unit.

11. The graphic data compression method according to claim 10, further comprising a step of: writing the uncompressed data processed by the processing unit to a dynamic buffer area in the memory, wherein when the mixed-type compression unit fails to compress the data, an external buffer management unit of the graphic data compression device uses a spare space in the memory to form the dynamic buffer area.

12. The graphic data compression method according to claim 11, wherein when the mixed-type compression unit fails to compress the data, the fixed area in the memory for storing compressed data is defined as the spare space, and the dynamic buffer area formed by the external buffer management unit comprises the fixed area.

13. The graphic data compression method according to claim 10, wherein if a ratio of the size of the data after compression by the mixed-type compression unit to the size of the data before compression is not greater than the predetermined compression ratio, the compression is determined to be successful, and if the ratio of the size of the data after compression to the size of the data before compression is greater than the predetermined compression ratio, the compression is determined to be unsuccessful.

* * * * *